(12) United States Patent
Johnson et al.

(10) Patent No.: US 7,464,269 B2
(45) Date of Patent: *Dec. 9, 2008

(54) SECURE METHOD AND SYSTEM FOR HANDLING AND DISTRIBUTING DIGITAL MEDIA

(75) Inventors: Harold J. Johnson, Nepean (CA); Stanley T. Chow, Nepean (CA)

(73) Assignee: Cloakware Corporation, Ottawa, Ontario (CA)

( * ) Notice: Subject to any disclaimer, the term of this patent is extended or adjusted under 35 U.S.C. 154(b) by 476 days.

This patent is subject to a terminal disclaimer.

(21) Appl. No.: 10/485,320

(22) PCT Filed: Jul. 26, 2002

(86) PCT No.: PCT/CA02/01170

§ 371 (c)(1),
(2), (4) Date: Jul. 27, 2004

(87) PCT Pub. No.: WO03/012603

PCT Pub. Date: Feb. 13, 2003

(65) Prior Publication Data

US 2005/0021989 A1    Jan. 27, 2005

(30) Foreign Application Priority Data

Jul. 30, 2001    (CA) .................................... 2354470

(51) Int. Cl.
*H04L 9/00*    (2006.01)
(52) U.S. Cl. ........................................ 713/176; 713/194
(58) Field of Classification Search ........................ None
See application file for complete search history.

(56) References Cited

U.S. PATENT DOCUMENTS 5,659,613 A * 8/1997 Copeland et al. ............ 380/202
6,389,538 B1 * 5/2002 Gruse et al. ................. 713/194

FOREIGN PATENT DOCUMENTS

| EP | 1 011 269 | 6/2000 |
| WO | WO 01/03363 | 1/2001 |
| WO | WO 01/44900 A2 | 6/2001 |

OTHER PUBLICATIONS

Dekoda: "Re; Best Slide Show Viewer"; WWW. [Online]; Nov. 21, 1999; URL:http://groups.google.com/groups?firehand+ember+slideshow.

* cited by examiner

*Primary Examiner*—Pramila Parthasarathy
(74) *Attorney, Agent, or Firm*—Jeffrey M. Measures; Borden Ladner Gervais LLP

(57) ABSTRACT

A great deal of intellectual property is currently handled digitally, in the from of audible, visual, or audio-visual files or data streams. With today's powerful electronic equipment and communication networks such as the internet, this digital content can be reproduced flawlessly and distributed without control. While attemps have been made to protect such digital content, none of the existing protection techniques have been successful. The invention provides a system and method of protecting digital content by integrating the digital content with an executable software package such as a digital media player, executing some sort of protection mechanism (such as password, watermark or encryption protection), and then encoding the software into a tamper-resistant form. In this way, the digital content can be used by initiating the executable software it was encoded with, but the content itself cannot be accessed, nor can the protection mechanism be cracked.

15 Claims, 5 Drawing Sheets

SECURE METHOD AND SYSTEM FOR HANDLING AND DISTRIBUTING DIGITAL MEDIA

RELATED APPLICATIONS

This application is a National Stage Application of PCT/CA02/01170, based on a prior Canadian Application No. 2,354,470 having an earliest priority date of Jul. 30, 2001, the entirety of which are incorporated herein by reference.

FIELD OF THE INVENTION

The present invention relates generally to computer software and communication, and more specifically, to a method and system which allows digital media to be securely handled and distributed.

BACKGROUND OF THE INVENTION

Much valuable intellectual property takes audible, visual, or audio-visual forms, and can be transported electronically as digital files or digital streams. Such highvalue information, representable as a digital file or a digital stream, is referred to herein as content. Such content includes books (transmissible forms for print media), popular songs, both in audible form and in audio-visual ('rock video') forms, movies, sports broadcasts, and news in a variety of forms including text, audio, or audio-visual. Such digital content is well structured for presentation to end users, however, it is poorly structured for enforcement of ownership rights.

Digital devices and communication networks are now almost pervasive in industrialized nations. Because these systems are digital, the storage, transfer and reproduction of data can be performed flawlessly; each successive copy of a digital file may be made precisely the same as the original. This ability to copy and transfer digital data with virtually no loss in quality is having a great impact on many digital rights holders, including music, movie and software producers.

Many techniques for protecting the intellectual property rights of these digital content and software producers have been proposed but have had little success.

Currently, the protection of this intellectual property is provided by means which separate the protection from the content. For example, if the content is protected by encryption, it cannot be used without decryption, and the device or program which performs the decryption is separate from the file or stream containing the encrypted content.

This model does have an advantage in that a media player can be distributed once and then can handle various forms of content. However, content files are now becoming sufficiently large that the resource savings from using a single, universal player, is becoming less and less significant. A two-minute movie trailer, for example, may require 4 MB (megabytes, or millions of bytes) of data, while a simple MPEG (motion picture experts group) player may only require 80 KB (kilobytes); 2% of the size of the data file. As well, universal media players have a number of weaknesses as noted below.

First, the media player, since it covers much content, is re-used a great deal. If the protections in the media player are ever compromised, all content played via that media player is exposed. That is, when the media player is separate from the content, it is vulnerable to class cracks: cracking the media player effectively cracks the protection for all content that it can play.

Some audio players, for example, will allow the user to play AVI files (a common format for digital audio files), but because a certain flag has been set in the AVI file, will not allow it to be copied or stored. If the audio player can be modified so that it can no longer detect this flag, then the audio player will allow all AVI files to be copied or stored without restriction.

Also, in practice, the separation of the protection measures from the protected content has meant that the protection is not provided by the content owner. For example, the National Basketball Association (NBA) does not own the media via which NBA games are broadcast or web-cast, and does not provide the hardware or software used to protect this content. Even content owners such as Warner Brothers do not typically own the means whereby the presentation of their content is protected when displayed on a personal computer (PC) or transmitted via a set-top box on a television set. Hence, the separation requires that the content owner trust intermediaries in order to be paid for providing it.

Digital marking may be used to provide legally enforceable copyright protection.

The two most common digital marking techniques are: 1. watermarking; the embedding of a hidden copyright message in a data file; and 2. fingerprinting; the embedding of a hidden identification number such as a serial number in a data file. (see, for example, Protecting Ownership Rights Through-Digital Watermarking, H. Berghel and L. O'Gorman, 1996, IEEE Computer 29: 7, pp. 101-103, and Protecting Digital Media Content, Nasir Memon and Ping Wah Wong, 1998, Communications of the ACM 41: 7, pp. 34-43). Additional marking techniques are known in the art.

However, the nature of digital media makes it so difficult to provide effective digital marking that some consider it impossible to provide an indelible digital mark (i.e., one which must be preserved if the content is substantially preserved). Memon et al provide commentary on this, as do Fabien A. P. Petitcolas, Ross J. Anderson, and Markus G. Kuhn in Attacks on Copyright Marking Systems" 1998, 2nd Workshop on Information Hiding, LNCS vol. 1525 (isbn 3-540-65386-4), pp. 218-238. In this case, the separation of the protection (legal enforcement) from the would-be protection (the watermark) is not the problem: rather, the easy erasure of the mark is.

Digital marking, were it truly feasible, would provide an alternative protection model, based on legal enforcement (as with the current copyright for printed matter).

However, it is currently trapped between two incompatible needs (see Memon et al, Bender et al, or W. Bender, D. Gruhl, N. Morimoto, and A. Lu. 1996. Techniques for data hiding. IBM Systems Journal 35: 3-4, pp. 313-336, for example). A digital mark is a steganographic embedding of a copyright message or an identification code in a digital information stream (such as a video or audio stream). Its concealment from the attacker is required so that it cannot be removed trivially. Hence, it must affect those aspects of the data stream which are unimportant to the content as perceived by the human viewer or listener. One such technique is to store a digital mark in the least significant bits of data points which are not critical to the user's enjoyment of the data file.

However, an attacker, knowing that the digital mark is embedded in such 'perceptually irrelevant' information, can simply scramble all such perceptually unimportant aspects of the data stream or data file, thereby either erasing the mark or rendering it sufficiently ambiguous that it becomes useless.

That is, the very nature of digital media-the digitization of a perceptually imprecise analog signal=militates against the feasibility of indelible digital marking in such media files or streams. While this problem may well be solved in the long run, in the current state of the art, it remains an unsolved problem (even if it were solved, it would still be safer to deploy it in concert with the instant invention, in order to increase the protection of the digital content).

There is therefore a need for a method and system of handling and distributing digital media in a manner which is secure against attack. This method and system should preferably reduce the content owner's cost of content presentation to consumers, and to change the nature of the protected entity so that effective digital watermarking is feasible.

SUMMARY OF THE INVENTION

It is therefore an object of the invention to provide a novel method and system of access control which obviates or mitigates at least one of the disadvantages of the prior art.

The instant invention addresses the above needs by combining the informational and protective aspects of digital content, whether in files or in transmitted streams, into a single entity which contains both an instance of digital content and the protection needed for such content.

In other words, the invention provides means whereby the protective machinery for the content (much of which is executable) and the digital content itself (which is usually not executable per se) can be combined, reducing the risk of piracy and reducing the cost of players which provide the content to consumers. It also changes the nature of what is protected so that indelible digital watermarking becomes feasible in the present, instead of at some unknown future date. Finally, it permits protection to be provided individually for different instances of active content, preventing the exposure of a great deal of content via a class crack on the player.

We call such a combination, containing:
1. enforced behaviour,
2. content protection,
3. a form suitable for digital watermarking, and
4. protected digital content, active content, and its use in connection with appropriate media, secure digital media.

According to the preferred embodiment of the invention, active content is in the form of tamper-resistant software (TRS) which either contains or accesses a large volume of information (the digital content).

Active content has three highly desirable characteristics: 1. protection can be ab initio, that is, the content can be released to any intermediary distributor in an already-protected form; 2. since the protection is not separable from the content, there is no fear of class cracks. Each new piece of content requires a separate crack of the separate instance of active content in which it is embedded; and 3. the fact that active content is essentially a program containing or emitting a large digital information stream, rather than the digital information stream itself, permits effectively indelible digital marking. That is, it permits the application of a digital mark which is prohibitively effortful for an attacker to remove.

One aspect of the invention is broadly defined as a method of protecting digital content comprising the steps of: integrating a digital media player with a set of data content; effecting a protection mechanism; and encoding the protected, integrated digital media player and data content, to tamper-resistant form; thereby securing the data content in an executable file, and payable.

Another aspect of the invention is defined as an electronic device comprising: means for integrating a digital media player with a set of data content; means for effecting a protection mechanism; and means for encoding the protected, integrated digital media player and data content, to tamper-resistant form.

BRIEF DESCRIPTION OF THE DRAWINGS

These and other features of the invention will become more apparent from the following description in which reference is made to the appended drawings in which.

DESCRIPTION OF THE INVENTION

According to the invention, digital content which is to be protected is incorporated into an executable program. This program, we call active content, since it is an executable wrapping for some data entity.

By a 'program', we mean an executable entity, including its data. The data, or parts of the data, may be separate from the program proper. However, the program and the data are designed to be used together, whether the data is in the form of a small amount of information which could fit easily into a computer's memory, or a larger amount which could be stored in a file on some mass medium such as a magnetic disk, drum, or CD ROM, or an input stream received over some form of communications network over some period of time.

There is a spectrum of software protection which runs from ordinary software through obfuscated software to TRS. Ordinary software is wide open to attack: it neither conceals information nor degenerates into nonsense when subjected to tampering. Obfuscated software has been intentionally modified to conceal its information. However, unlike TRS, obfuscated software may be modified by tampering without degenerating into nonsense.

At the far end of the spectrum lies TRS. TRS is software which: 1. conceals its embedded secret information from an attacker; and 2. resists tampering, in the sense that modifying the code will, with high probability, produce nonsensical behaviour.

That is, it is computationally very difficult to make a change to the software which the attacker would consider useful. Making arbitrary, non-purposeful changes is, as with any stream of digital information, trivial. TRS protects software against effective, goaldirected changes such as overcoming a protection mechanism.

As in the case of encryption, the protection provided by TRS is relative, rather than absolute. TRS makes the job of the attacker highly effortful. The level of effort can be varied by varying the degree and variety of software encoding used in converting the software to be protected into TRS form. When an appropriately strong level of TRS protection is used, this means, as in the case of encryption, that in practice, the protective measures in TRS are prohibitively costly to bypass.

However, there is a profound difference between the encryption of a message into ciphertext and the conversion of software into TRS: ciphertext is useful only when it is decrypted, whereas TRS is useful without any change of form. That is, TRS is executable, just as normal software is.

The TRS version of a program does the same job as the normal version of the program, but it is far less vulnerable to hacking attacks.

There are commercially available obfuscators for this purpose. Our preferred embodiment for active content, which maximizes the efficacy of the content protection, behavioural enforcement, and digital marking it provides, is to convert the active content to TRS form described using the techniques hereinafter.

Figure 1:
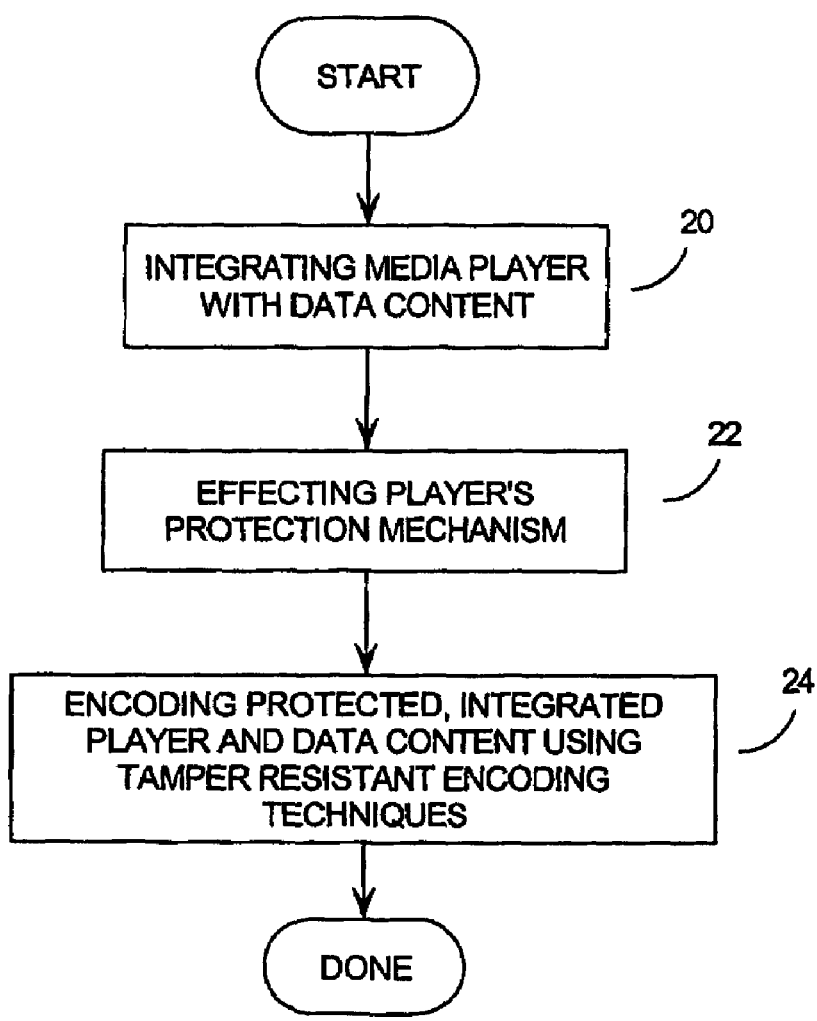
FIG. 1 presents a flow chart of a general algorithm for implementation of the invention.

The broad methodology of the invention, which addresses the objects outlined above, is presented as a flow chart of FIG. 1. This figure presents a method for securing media files which proceeds generally as follows.

First, a media player is integrated with a data content file at step 20. As will become clear from the description which follows, the "integration" may take many forms. At one extreme, the data content may be stored within the media player, the two entities becoming a single file. In other cases, the "integration" may simply consist of coding the media player to point at a targeted data content file.

Also, while this example of the invention impies that the "mediaplayer" is an audio, visual or audio/visual player, clearly the invention is not so limited. The "media player" could also present still images such as Autocad drawings or email text, or any other content which might be presented to the end user.

This step might be performed in response to a command line input, interaction with a GUI (graphic user interface), instruction from another application, or another technique as known in the art. In some cases this step may require the compilation and storage of high level computer code as executable code, while in other cases the media player may already be in an executable form. The invention is not limited by the manner in which this is done.

Next, a protection mechanism is now effected on the integrated media player and data context, at step 22. There are a number of protection mechanisms known in the art, including the following: 1. applying a digital mark to the data content; 2. encrypting the data content; or 3. requiring that the user enter a correct password before certain functionality is allowed.

As will be clear from the description which follows, other techniques could also be used. Several are described in greater detail hereinafter.

In many cases, media players have one or more of the above already integrated with their software. Thus, it is simply a matter of effecting the protection which is already there.

The integrated and protected mediaplayer/content file is then encoded using tamper-resistant software (TRS) encoding techniques at step 24. Protecting the executable program using TRS encoding techniques prevents attackers from analyzing the operation of the software, which prevents attackers from overcoming the protection mechanism effected at step 22, or extracting any of the digital content contained in the executable code into a freely usable form. A number of tamper resistant software (TRS) encoding techniques are known in the art.

Encoding software into a TRS form frustrates the attacks of hostile parties in at least the following ways: 1. it generates software which is "obscure"; that is, software whose inner workings are incomprehensible; and 2. it generates software which is "chaotic" in that a modification at any point will almost certainly produce a nonsensical result.

The obscurity of TRS, and its chaotic response to tampering, are both relative rather than absolute. As in the case of the obscurity provided by cryptography, these properties are removable in principle: however, we can make the required effort for such removal expensive for the attacker. TRS techniques which are particularly effective in active content applications are described hereinafter.

The requirement for making this approach viable is that reversal of the TRS obscurity be prohibitively expensive for the attacker. Thanks to the processing power and memory capacity of computing devices available today, the executable code can be cloaked with a high degree of TRS-protection, yet still be executed quickly enough that it can be used for real time applications such as playing media files.

As will be described hereinafter, different portions of the executable code can (and should) be protected using different TRS encoding techniques. Tasks that need not be performed in real time, such as checking a password, may be protected with very intensive TRS encoding; users will not generally be concerned about a five second delay when attempting access, so very strong TRS protection may be applied to this portion of the executable code. Also, the more computer resources required to run the access checking routine the harder an attack will be: an attacker needs many runs for cracking whereas regular operation required just one run. In contrast, tasks that must be performed in real time, such as the playing of content, may have to be protected with a more modest degree of TRS encoding.

While FIG. 1 implies that the step of tamper-resistant encoding (step 24) must be done after steps 20 and 22, the invention is not so restricted. In fact, the step of tamper-resistant encoding can be performed after either step, or at any point within either step. As noted above, the TRS-encoding may be applied to different portions of the executable software code in different ways. Thus, the TRS-encoding software may be implemented as a set of separate routines which are applied to the targeted executable software in different ways, and at different times.

Note that the usual procedure in preparing TRS, is to "throw away the key" after the encoding is performed. That is, to destroy the encoding information, intermediate values and variables, used to perform the TRS encoding, after it has been completed. Thus, not even the owner can reverse engineer the encoded software.

The broad method of the invention thereby provides a number of major advantages over the prior art. To begin with, it enables digital media to be securely handled and distributed the digital media being obscured so it cannot be compromised by an attacker. With the separation of protection from content avoided, the owner of the intellectual property can provide ab initio protection for the property: it could leave the premises of the owner already protected, reducing the owner's risk of piracy and its consequent financial loss.

The method of the invention also reduces the content owner's costs. Since part of the value of playing the content is the protection, it raises the value of the content at the expense of the content-playing software. Fusing the protection with the content itself, rather than relying on the protective aspect of the player, reduces the complexity and therefore the cost, of the player which presents the content to the consumer. The player could be a very low cost commodity indeed, reducing the owner's cost in presenting the content to a consumer.

As well, with the invention, the content owner is no longer controlled by the supplier of the media player, as any media player may now be used. This provides content owners with a major business advantage over their previous position.

The preferred embodiments described hereinafter provide many further advantages over the prior art.

PREFERRED EMBODIMENTS OF THE INVENTION

First, by means of background, it is noted that the method of the invention may be applied on virtually any computer or microprocessor-based system. An exemplary system on which the invention may be implemented, is presented as a block diagram in FIG. 2. This computer system 30 includes a display 32, keyboard 34, computer 36 and external devices 38.

Figure 2:
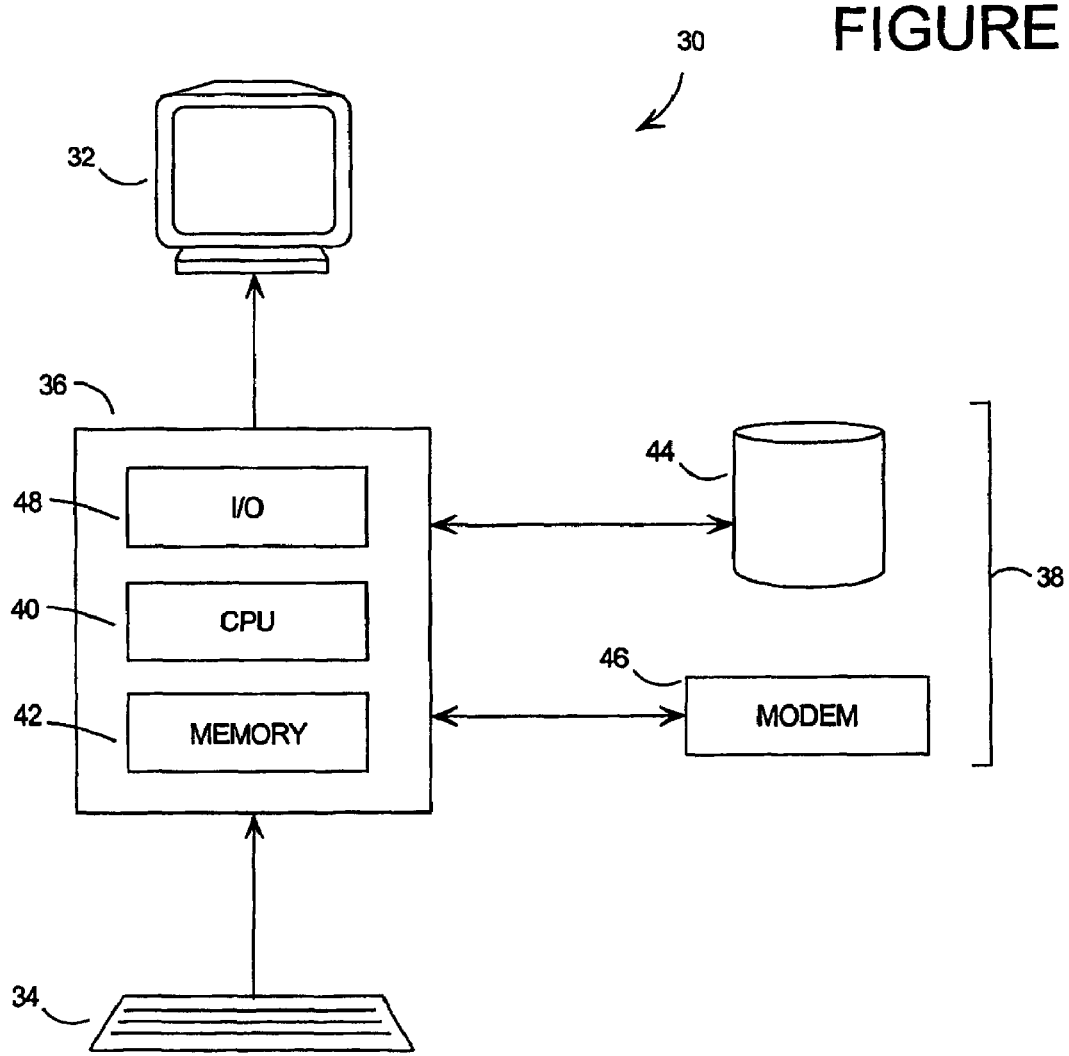
FIG. 2 presents an exemplary computer system in which the invention may be embodied.

The computer 36 may contain one or more processors, microprocessors, digital signal processors or micro-controllers, such as a central processing unit (CPU) 40. The CPU 40 performs arithmetic calculations and control functions to execute software stored in an internal memory 42, preferably random access memory (RAM) and/or read only memory (ROM), and possibly additional memory 44. The additional memory 44 may include, for example: mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 44 may be physically internal to the computer 36, or external as shown in FIG. 2.

The computer system 30 may also include other similar means for allowing computer programs or other instructions to be loaded. Such means can include, for example, a communications interface 46 which allows software and data to be transferred between the computer system 30 and external systems. Examples of communications interface 46 can include a modem, a wireless transceiver, or a network interface such as an Ethernet card, a serial or parallel communications port.

Software and data transferred via communications interface 46 are in the form of signals which can be electronic, electromagnetic, optical or other signals capable of being received by communications interface 46. Multiple interfaces, of course, can be provided on a single computer system 30.

Input and output to and from the computer 36 is administered by the input/output (I/O) interface 48. This I/O interface 48 administers control of the display 32, keyboard 34, external devices 38 and other such components of the computer system 30.

The invention is described in these terms for convenience purposes only. It would be clear to one skilled in the art that the invention may be applied to other computer or control systems 30. Such systems would include all manner of appliances having computer or processor control including telephones, cellular telephones, televisions, television set top units, point of sale computers, automatic banking machines, lap top computers, servers, personal digital assistants (PDAs) and automobiles.

Second, while exemplary embodiments described herein focus on particular applications and digital rights management (DRM) techniques, the method of the invention may be applied to any manner of handling and distributing digital media.

Text documents, hardware simulation code, and voice message in a voice-over-IP environment, for example, could all be protected in this manner.

The most common techniques presently used for securing digital media are: 1. digital marks and fingerprints. As described above, this consists of embedding a message in the data content which allows the owner to demonstrate that the content is theirs; 2. password protection, which only allows access to the content if the user can input a certain alphanumeric character string or electronic key; 3. device bonding, which only allows the digital media to run on a specific electronic device.

This is done by obtaining a machine fingerprint (such as a CPU number, NIC card number, Hard Drive volume name or number) that is hashed, and used as a key to encrypt the content or the integrated content and player; and 4. control flags, which limit the processing which can be performed on a given data file via flags set within it. For example, it is common to find audio files on the World Wide Web which can be downloaded and played, but not copied or stored. This is because the media players recognize flags within the content, which indicate that playing is allowed, but copying and storage should not be allowed.

Bonding to the platform will almost be inherent in the invention because a given media player will only run on a certain range of platforms. That is, if a data file is integrated with a media player that will only run on WindowsME, the user will not be able to export the integrated file to a device that is not Windows ME compatible.

Note that research and development in the area of DRM is ongoing, and that advances are expected to occur continuously.

The suitability of a particular DRM technique for a particular application depends on many factors. The most important considerations are: 1. performance: the likelihood of allowing access to an attacker, or denying access to a legitimate user; 2. demand on computing resources. Some systems, like password-based systems, have very little demand on system resources. The addition code requires very little storage area, and the processing required to test an access attempt is not very CPU intensive. At the other extreme, encryption-based protection is very CPU intensive; and 3. long term usefulness. Over time, for example, users may forget the passwords that were used to restrict access to certain data files. Digital marking techniques do not have this problem as they should last as long as the content does.

There are also other criteria which be significant in different applications.

Third, there are many TRS encoding techniques, some of which are proprietary, and some of which are known in the art. These techniques may generally be categorized as follows: 1. Cloaked data-flow concerns TRS implementation of ordinary computations on small pieces of data-the building blocks of larger computations; 2. Cloaked control-flow concerns TRS implementation of software decision making and the structure of execution, which glues all larger computations together from smaller pieces; 3. Cloaked mass data concerns TRS implementation of concepts such as files, arrays, dynamic allocation, and linked structures with potentialaliasing; and 4. White-box encoding concerns cryptographic encoding of functions and transforms for an environment in which the software can be observed in complete detail without revealing internal data, such as a secret key.

It is somewhat misleading to divide encoding techniques out in this manner.

The above categories, while they are handled in different ways, are generally not handled in isolation. A significant degree of control-flow protection is achieved using data-flow encoding techniques, for example.

The variables in the control-flow statement IF X=2*Pi*R THEN GO TO 100 could be data-flow encoded by making the following substitutions throughout the program:

$$X'=0.5X+3$$

$$R'=R(2*Pi)$$

Substituting these equalities into the control-flow statement above yields: IF 2X'−6=R'THEN GO TO 100. Thus, while only data-flow encoding has been performed, the control-flow statement has been obfuscated considerably.

We prefer that TRS be much more than simply obscure. It should also resist tampering. That is, it should preferably be aggressively fragile under tampering, so that attempts to change its functionality result, not in the desired change, but in useless pieces of nonsense code. (Avoiding a visible point of failure prevents leakage of information about why the functionality has become nonsense.) The techniques described herein, have this property.

As with encryption, the mapping from original form (plaintext or ordinary software, respectively) to encoded form (ciphertext or TRS, respectively) is one-way: it is very much easier to encrypt or cloak, respectively, than to decrypt or de-cloak, respectively, unless the secret information used in encrypting or cloaking is known.

However, the conversion of software into TRS form is not a form of encryption.

Encrypted messages are useless without a key. In contrast, TRS is software which can do its job perfectly well while remaining in TRS form. This is a significant difference, and means that the applications of cryptography and the applications of TRS are orthogonal and complementary: each does something that the other cannot.

Data-Flow Encoding

By data-flow, we mean the 'ordinary computation' of a program: addition, subtraction, multiplication, division, Boolean computations, masking operations, and the like: the scalar data-flow of a program.

There are two primary aspects of data-flow encoding: obscuring the computation to hide the data which the computation manipulates, and making the computations aggressively fragile under tampering.

The obscuring is achieved by various data encodings. Even very simple encodings can provide a great deal of protection. Our simples encoding is of the form x'=sx+d, where x is original and x' is cloaked. That is, at each point in the targeted program where the variable x appears, it is replaced with its encoding. When this is done for a large number, or all, of the variables in the targeted program, the resulting code will bear little resemblance to the original code.

An attacker may be able to deduce how unprotected software code operates because variables are generally defined with respect to "real-world" concepts and measures, and the equations will often look familiar. However, when the same program is protected by data-flow encoding, the variables will lose their "real-world" appearance, as will the equations. Thus, an attacker will not be able to obtain any useful information from a simple review and analysis of the encoded program.

Many other data-flow encodings may also be made. To perform a cloaked addition of constant c to variable x for example, we simply interpret the value of x' according to x'=s (x−c)+d (i.e., according to x'=sx+k where k=d−cs) instead of according to x'=sx+d.

Note that the formula must subtract c. Since x' has not changed, the new formula makes x appear to be larger, which is what we want. If we to add c instead, we are actually representing the subtraction of c from x.

To add a variable instead of a constant, we need actual code, but the transform space for addition using a 64-bit implementation is over 100 bits; a brute-force attack on a space of this size is plainly feasible (a brute-force attack is one in which all possible combinations of data values are checked until the correct one has been discovered). The mappings we use in practice vary from the simple transformations above, to complex multidimensional transforms combining multiple mathematical domains. This approach is highly effective for obscuring the data-flow.

The other aspect of data-flow cloaking for TRS is to induce aggressive fragility under tampering. This is achieved by generating code according to the following policies: 1. every computation depends on as many others as possible. This may be done simply by creating new variables which are defined as a combination of original variables; 2. the interdependencies are complex, so that, with high probability, an arbitrary change causes invalid computation to occur; 3. execution is 'fake robust': invalidities do not cause failure; execution simply continues in the form of nonsense computation. If, for example, an array A is known to have 100 elements, then converting the expression A [i] to the expression A [i mod 100] makes it fake-robust in that variable i may take on any value and not cause an array bounds error. However, certain values of variable i may cause nonsensical operation elsewhere in the program without causing a complete failure; and 4. any directed change to behaviour (i.e., any change whose result is not nonsense computation) requires that several changes, related in obscure and complex ways, be performed absolutely perfectly.

Further information on this subject is available in the co-pending patent application titled: Tamper Resistant Software Encoding, filed under the Patent Cooperation Treaty on Jun. 8, 2000, under Ser. No. PCT/CA00/00678, by Stanley Chow, Harold Johnson, and Yuan Gu.

Control-Flow Encoding

The control-flow of a program refers to the decision points and branch instructions that govern which lines of code in the program are to be executed. In broad terms, control-flow encoding increases tamper-resistance by adding fake-robust, data-driven, control transfers to the software code. If a large number of control transfers are added to the software code, it will be extremely difficult for the attacker to identify the specific line of control that he wishes to analyze or modify.

Generally, control-flow encoding ensures that what was one control transfer, has been instantiated in multiple parts of the code, and that control transfers from different parts of the code are often merged into one. As the added control transfers are fake-robust, the erroneously modified program will appear to continue executing properly, while in fact it is not. Since control is exercised using a complex data-driven scheme, any attempt to modify a single control transfer will almost certainly affect others (this is described as the "anti-hologram" property), especially where multiple control transfers are often combined into one (the "togetherness" property), as they are in this invention.

As well, if the attacker makes a number of modifications, by the time the erroneous operation is discovered, it will not be possible to tell which of the modifications caused the erroneous operation.

Figure 3:
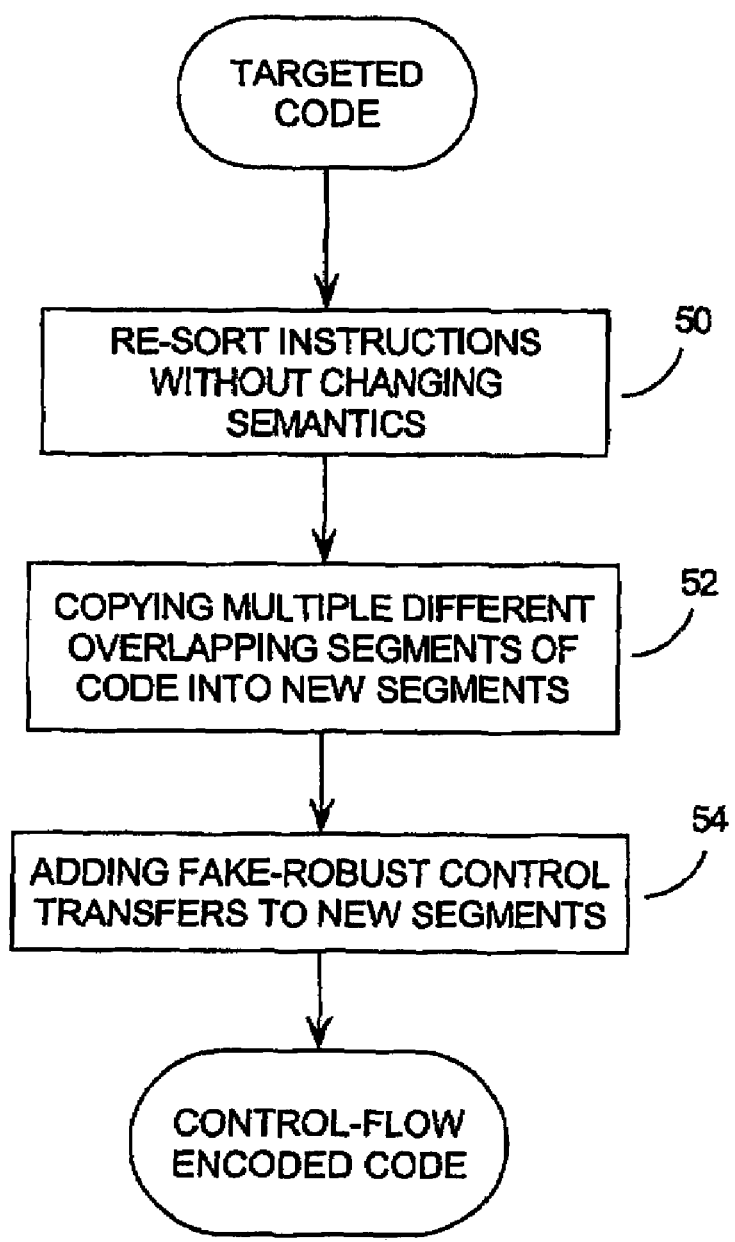
FIG. 3 presents a flow chart of a method for performing control-flow encoding in an embodiment of the invention.

The general implementation of control-flow encoding is presented as a flow chart in FIG. 3. First, at step 50, the operations in the targeted code, preferably in SSA (single-static assignment) or similar intermediate form, are re-sorted without changing the semantics of the program. When the code is in an intermediate form, the interdependencies of the intermediate statements are clear and the bounds on what re-sorting could be performed may be easily determined. The understanding of these interdependencies is what allows multi-threading and optimization techniques as known in the art. SSA is a very commonly used intermediate form.

In the case of the invention, these instructions can be re-sorted so that a direct decompiling into high level language yields obscure results. However, an enormously greater benefit is realized with the synergy between re-sorting of the code and the creation of "fake-robust" targets at step 54. A fake-robust target is one which will appear to operate correctly when it is modified, but in fact, results in nonsensical operation.

The strategies and limitations for re-sorting the code instructions will vary between applications, and with the type of intermediate code that is used. These restrictions would be clear to one skilled in the art.

At step 52, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 54, new control transfer instructions are added to make reference to the new code segments created at step 52. These references will generally be fake robust as they refer to the segments of the original code that were slightly modified at step 52, but will not be perfectly fake robust unless measures are taken to ensure they will not fail. Fault-resistant programming techniques are known in the art and could be implemented as desired or required.

The targeted code is now protected by control-flow encoding.

Additional details on control-flow encoding may be found in the co-pending patent application titled: Tamper Resistant Software-Control-flow Encoding, filed under the Patent Co-operation Treaty on Aug. 18, 2000, under Ser. No. PCT/CA00/00943; inventors: Stanley Chow, Harold Johnson, and Yuan Gu.

When applied extensively, control-flow encoded software is cloaked so that: 1. each original operation is represented, variously cloaked, at multiple cloaked sites; 2. a single cloaked site also represents multiple original sites; 3. there is no difference between 'decoy' and 'significant' computation; 4. cloaked routines do not preserve the boundaries of the original routines; 5. execution paths include a pseudo-random component: any change in input data causes pervasive changes to branch patterns; 6. both data-and control-flow are made fake robust: the tampering does not cause failure (traps, core dumps, error messages, or the like); it simply causes execution to continue in a nonsense fashion; and 7. all aspects of control-flow are subjected to all aspects of data-flow cloaking.

This protects the control-flow of the targeted software from standard attacks as follows: 1. Branch jamming will not work because: a. no specific branch can be found to jam, b. jammed branches subvert the operation of the data-flow functions, producing nonsensical data-flow; and c. multiple sites require jamming, with sizable changes to their data-flow, to achieve the effect of a single branch jamming in the original program; and 2. simplification of the control-flow encoded software is extremely difficult because: a. due to various data-flow cloaking, distinct sites which share 'original' functionality have quite different code; b. data-flow coding mixes dependencies and hence, entropy among functionalities at each site, and the mixing must be fully understood before simplification is possible; c. simplification requires removal of the pseudo-random component from branches, but it appears indistinguishable from the normal components; d. simplification requires unraveling of both the branching and the data flow together; and e. almost any perturbation-based analysis on control-flow, in effect, involves branch jamming, and will fail as branch jamming will fail.

Mass Data Encoding

To convert large data structures into TRS form (arrays, linked structures, file buffers, and the like), we cloak them so that: 1. the information in the large data structures, and the addresses at which they are stored, are meaningless without the accessing code. The cloaked data structures themselves have no meaning for the data; and 2. uncloaked information appears nowhere; all aspects of such data always appear in cloaked form.

Our approach is general, and covers file input and output (I/O) as well as in-memory data structures, dynamic data structures, and aliasing.

Mass data encoding relies on the random or pseudo-random dispersion of data being stored, throughout the available memory or an area of the available memory.

This dispersion makes it very difficult for an attacker to locate certain pieces of data he is searching for, and also distributes the data values with respect to one another.

Thus, data are not stored in areas of the memory one might expect them to be, and there are no clearly identifiable blocks or patterns of data in the memory.

A simple technique for performing mass data encoding is to respond to a request to store a data value at a virtual address, by mapping that virtual address onto a randomly selected actual address. This mapping may be done in a truly random manner, but will generally be done in a pseudo-random manner, because of the difficulties in generating truly random numbers in pure software. A desirable technique for generating pseudo-random address is by use of a hash function, which generates what appears to be a random number from a given input. In the formal sense, the definition of a hash function is somewhat more restrictive, but it is clear in this case that any function may be employed which maps a given input onto a random or pseudo-random output.

Each time the encoded software routine is executed, it would access the stored data transparently because the pseudo-random mapping is built into the encoded program. This could allow a patient attacker to monitor all memory lookups and generate a mapping table, however, if the software routine was also protected using data and control-flow encoding, it would virtually impossible to do so.

By storing data in a dispersed manner through the available memory space, it is impossible for an attacker to obtain anything meaningful from analyzing the stored memory. In the prior art, data is stored in successive or adjacent memory locations, but in the case of the invention, the memory-wise spacial relationship has been removed, and the data is now dispersed in a pseudo-random manner.

As noted above, this dispersion makes it difficult for an attacker to locate certain pieces of data he is searching for, but also distributes the data values with respect to one another.

Thus, data are not stored in areas of the memory one might expect them to be, and there are no clearly identifiable blocks or patterns of data in the memory.

For example, one avenue of attacking an encrypted memory is to search for repetitious patterns. In a text document which is encrypted with a single key, a given word will appear as the same encrypted data, each time it occurs in the original document. Thus, the attacker can identify a block of encrypted code which appears to be repeated often in the memory and assume that it corresponds to a commonly used word. The attacker would start by identifying the statistically most common words, calculating a corresponding key, and determining whether the rest of the encoding makes sense in terms of that key. In English, candidates for a short encoding might include, for example: "the", "is", or "if".

With mass data encoding, each of the letters in these short words could be stored in dispersed locations in the memory. Thus, when the word "the" is stored, the codes corresponding to these three letters will not appear together, but be randomly dispersed throughout the memory. There is therefore no repetition of a code pattern in the mass data storage, for an attacker to exploit.

The following mass data encoding techniques may also be used to complement the main invention. These additional techniques may be applied collectively, or independently to obtain varying degrees of security: 1. using different hashes for different data addresses, making it more difficult for the attacker to correlate different codings; 2. varying the hashes and encryption keys while the target program is running, so that an attacker obtains no benefit from decoding only a part of the routine, at some point in time; 3. encrypting the data being stored; and 4. using data-flow encoding of the address and data before even beginning the mass data encoding. In this way, the data and addresses are encoded at all times and unprotected data is never exposed.

Additional details on mass data encoding appear in: Tamper Resistant Software-Mass Data Encoding, filed under the Patent Co-operation Treaty on Apr. 12, 2001, under Ser. No. PCT/CA01/00493); inventors: Stanley Chow, Harold Johnson, and Yuan Gu.

White-Box Encoding

White-box encoding concerns cryptographic computation which can be observed in complete detail without revealing internal data such as a secret key.

Most security software is designed under the assumption that the software will be applied in a secure environment, that is, in a black-box model. This is generally unrealistic, and as a result, most security software cannot withstand a concerted attack. The "white-box" encoding model assumes that an attacker will have complete access to the targeted software, and thus, the algorithm itself must be protected against analysis and modification.

The white-box techniques of the invention provide ways to make finding an embedded cryptographic key or other hidden information combinatorially difficult for the attacker, even under this severe threat model. Such methods are inherently bulkier and slower than software designed under a black-box model, but in digital mark extraction applications, the tradeoff is well worthwhile.

Figure 4:
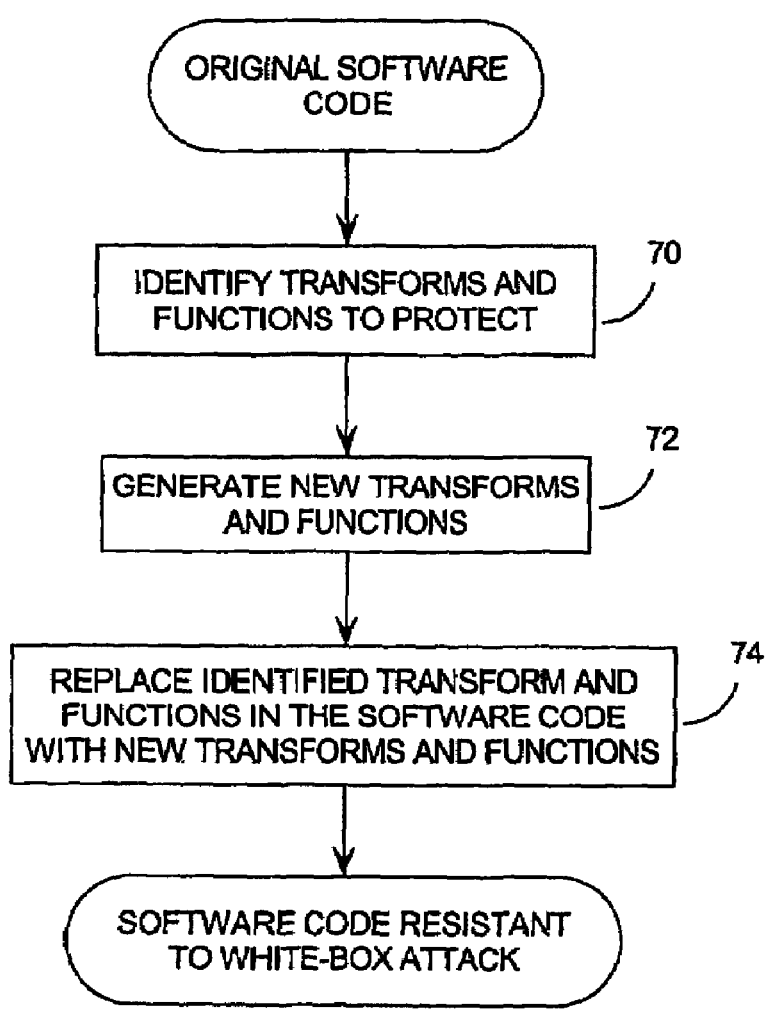
FIG. 4 presents a flow chart of a method for performing white-box encoding in an embodiment of the invention.

In broad terms, white-box encoding is implemented by as shown in the flow chart of FIG. 4. Firstly, functions and transforms substantive to the targeted software program are identified at step 70. Next, new functions and transforms which alter the processing activity visible to the attacker are generated at step 72. The identified functions and transforms are then replaced with the new functions and transforms in the software program at step 74.

A large number of different techniques may be used to encode the functions and transforms identified at step 70. These techniques may be grouped generally as follows 1. making transforms non-linear, so they cannot be reduced by an attacker; 2. making processing activity disappear, by generating new transforms that eliminate data (such as constants) and processing steps (such as combining two transforms together into one); 3. generating new, spurious, processing activity, by concatenating random transforms to real ones, and performing input and output encodings that introduce processing activity completely unrelated to the original data; and 4. encoding and widely diffusing sites of information transfer and/or combination and/or loss.

For example, a linear transform can be replaced with a simple lookup table. If unused portions of the lookup table are filled with random data, then the lookup table becomes non-linear and irreducible.

Lookup tables can also be partitioned so that they are accessed by concatenated input variables; that is, the table is indexed by the values of two variables, concatenated together. This has the effect of replacing two variables with a single variable having a lookup table which will generally be non-linear. If a lookup table is generated for a transform concatenated with a random transform, then the lookup table will almost certainly be non-linear and irreducible.

Hence, the invention can be employed to protect any manner of software from being analyzed, reversed-engineered, or simply observed to discover secure data such as secret keys. Secret keys can then be incorporated into software programs without the danger of the secret key being disclosed, or the program being altered to do anything other than what it was originally intended to do. As noted above, many digital marking algorithms employ secret keys to the extent that they contain secret data which defines the pattern of memory locations for the digital mark data, the parameters of any encoding, and the content of the digital mark itself.

More details on these and other white-box encoding techniques are described in the co-pending patent application titled System and Method for Protecting Computer Software from a White Box Attack, filed under the Patent Co-operation Treaty on Dec. 10, 2001, under Ser. No. PCT/CA01/01729; inventors: Stanley Chow, Harold Johnson, and Philip A. Eisen.

Figure 5:
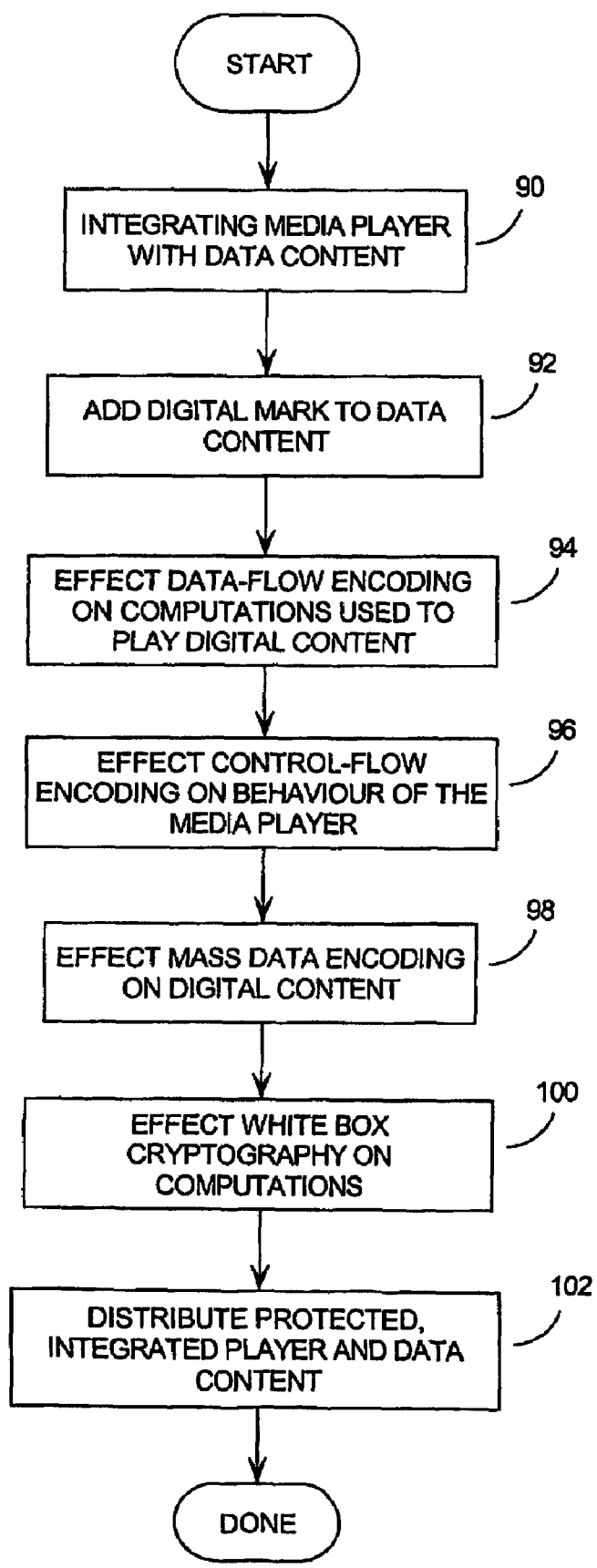
FIG. 5 presents a flow chart of an exemplary method of the invention.

An Exemplary Application of TRS Techniques to Digital Media Systems An exemplary implementation of the invention is presented in the flow chart of FIG. 5. In this embodiment, an audio or video digital media file is integrated with a media player and protected from tampering, so it is now in a form that it can be distributed (for example) on CD Roms, or posted on Web sites so that users can download these files either to personal computers (PC), personal digital assistants (PDA) or portable media players.

PCs have far more computing power than PDAs or portable media players, thus, files being executed on PC platforms can employ TRS encoding techniques that make the executable code more resource intensive to run. It is necessary, after all, for the media player to present content in real-time. However, as PDAs and portable media players become more powerful, it will be possible for them to use the more resource-intensive TRS techniques.

The process begins at step 90 where the media player is integrated with the media content. This step may also include the compilation of the media player from a high level language such as C code, into machine readable code.

The protective measures of the media player are now effected, which preferably takes the form of applying a digital mark to the media content at step 92.

These are many digital marking techniques known in the art which would be effective when applied with the balance of this routine.

Data-flow encoding is now applied to the integrated media player/media content, which now contains a digital mark, at step 94. As noted above, data-flow encoding protects the scalar data-flow and the ordinary computations of a program.

Different media players, digital marking techniques and media content may be suited to different forms of TRS encoding, but in general, data-flow encoding would be used to encode the scalar computations and ordinary computations used in playing the media content.

Using data-flow encoding, the digital mark will never be identifiable to an attacker observing the regular operation of the encoded program. More important, an attacker will not be able to identify the least significant data bits of the content, where the digital mark is usually hidden.

Next, control-flow encoding is used to encode the behaviour of the media player at step 96. As noted above, control-flow encoding protects the control logic, branch, and subroutine structure of the program. For example, control-flow encoding could be used to effect random access to the media content and the sequential access to pieces of the content; thus, if the control-flow were disturbed, chronological segments of the content would be scrambled.

Control-flow encoding could also be used to enforce desired behaviours such as those related to billing. Electronic commerce systems necessarily have critical decision branches which determine whether a particular access attempt should be considered a pass or a fail (for example, whether a user's password is acceptable, whether a user has sufficient funds in his account, whether a copy has already been made, etc.). If the attacker can locate this decision branch he could change it to approve all access attempts. Thus, this critical decision branch should be protected with control-flow encoding.

At step 98, mass-data encoding is then applied to the media content itself. As noted above, mass-data encoding protects mass-memory contents, that is, the contents of data structures, whether records, arrays, or pointer-linked, and the contents of external data structures such as the contents of files, messages, message pipes or other data streams, and the like. Mass-data encoding would protect the media content, so that it would be indecipherable without first cracking the data-flow and control-flow encodings. If the target device has sufficient resources, the mass data could also be encrypted using a manner of encryption known in the art (such as DES, AES, or some such symmetric key encipherment).

White-box cryptography is then applied to the program at step 100. As noted above, white-box cryptography protects cryptographic computations so that they can be performed without revealing their keys. In this particular application, white-box cryptography would be used to provide input-output mazes to ensure that the TRS could not be cracked in layers. Using the convention that, for any x, x' is its ordinary TRS version, and x" (where appropriate) is its white-box cryptographic version.

In the preferred embodiment, the following input and output schemes are used: input'=W2" (W," (Input)) for importing an ordinary value Input securely into the TRS world as Input', and Output=W4" (W3" (Output)) for exporting a TRS-encoded value Output' securely to the non-TRS world as Output, where W, and W3 are encryption functions, W2 and W4 are decryption functions, W2=WI-1, and W4=W3-1. For the sake of security, the size of Input or Output should be at least 64 bits, and preferably larger.

An alternative embodiment-a generalization of the method above-uses: Input'=D (D,' (Input)) for importing an ordinary value Input into the TRS world as Input', and Output=D4' (D3' (Output')) for exporting a TRS-encoded value Output' to the non-TRS world as Output, where D1, D2, D3,D4 are arbitrary complicated functions, D1', D2', D3', D4' are their conversion to TRS using some combination of one or more of the data-flow, control-flow, and mass data encodings, with D2=D1-1 and D4=D3-'.

As well, if the media player had certain functions as part of its operation, such as generating a strong password in response to an access attempt, then the function being used to generate the strong password could be protected with white-box encoding.

All of the above kinds of TRS encoding are relevant to the conversion of ordinary digital content into active content, and all are relevant to the security of such content whereby we justify calling the employment of such active content in appropriate media 'secure digital media'. Having access to the full armamentarium of encoding techniques as described above (data-flow, control-flow, mass-data and white-box encoding), permits us to cover a correspondingly wide spectrum of algorithms.

The content is now merged with the media player, and protected by its digital marking mechanism. This integrated program may now be made available to the public, either by being distributed on a CD Rom, or by posting it on a Web site so that it can be downloaded, at step 102.

As noted above, TRS will execute in the same way that any other executable code will execute. The executable code will be protected by the means effected at step 92, which cannot be undone by an attacker.

Advantages of TRS Over Alternative Embodiments

If we attempt to bundle together the executable protective code and the content, but we do not employ TRS, then we face the following difficulties: 1. indelible marking of ordinary or obfuscated software remains an unsolved problem. The extreme malleability of ordinary software, and the vulnerability of even obfuscated software to tampering attacks, makes it unlikely that it will be solved soon (if ever); 2. any security measures in the code and the data are revealed to a clever attacker, thereby vitiating such measures. While obfuscation of the software provides partial protection, obfuscated software remains highly susceptible to perturbation analysis, and other dynamic tracing attacks; 3. if ordinary software, or obfuscated software, rather than TRS, is used, the executable protection and the data content are easily separable. As soon as an attacker bypasses the security measures, the entire digital content is available to the attacker; and 4. the behaviour of ordinary software or obfuscated software is easily modifiable.

Therefore, any desired behaviours on the part of the user (such as those related to payment) cannot be enforced securely.

In contrast, if TRS is used, rather than ordinary software or obfuscated software: 1. given means to create TRS, indelible digitally marking can be achieved by the following mechanism: to mark a program P, instead of simply producing a TRS version, P', of the program P, we replace it with the TRS version Q' of the program Q, where Q is the program defined by the following pseudo-code: function Q(X): if X=K then return M else return P(X) where K is a special input, with a vanishingly small likelihood of being encountered in normal use (the key), and M is the digital mark to be embedded in the program and revealed by use of the key. Given any input but K, Q' behaves exactly as P or P' would behave. Given the input K, Q' emits the digital mark, M.

The important point is that TRS is a form of software which enables indelible digital marks, and as such, is a highly desirable form for the protection of content, which badly needs such legally viable protection in addition to other forms of protection; 2. any security measures in the code are concealed by the use of TRS; 3. using mass data encodings, the data portion is meaningless without the rest of the executable code-penetrating the data encoding is not possible without simultaneously penetrating the encoding of the executable code which accesses the data. Therefore, the attacker cannot separate the executable protection and the data content, and the attacker cannot gain direct access to the digital content; and 4. the behaviour of a TRS-form program is prohibitively difficult to modify without reducing the program to nonsense. Therefore the attacker cannot retain the usability of the content while simultaneously eliminating enforcement of behaviours (such as those related to payment).

Other Options and Applications

The invention can be applied with many other options and in many other applications, including the following: 1. an alternative methodology is to download player/content packages from a server to an end user (on a personal computer, for example), which are not watermarked or TRS-protected, but which execute on the end user's machine to become watermarked and TRS-protected (a "media batch file" of a sort).

In other words, the end user downloads a single executable file. When the end user executes this file, it applies a watermark to the content it was sent with, and then the new watermarked file is TRS-encoded with the player (which was also part of the original downloaded file). This process defers all of the CPU intensive processing to the end user's personal computer, rather than having it performed on the server The result of this execution on the client side may be an executable file, but does not have to be; for example, it may simply create a watermarked image; 2. protecting the digital content by encrypting it. The keys to undo the encryption may be stored in the TRS-encoded Player, where they would be safe from an attacker. This could be done by means of "partial evaluation": taking the fixed data values from the key and inserting them into the equations of the media player. When the data-flow encoding is performed, the original data values from the key are combined with other data values and "disappear" 3. the portability of the executable code can be severely limited by the judicious selection of the player itself. If the player can only operate on a single platform, then once in the TRS-encoded form, it will be impossible for attackers to move it elsewhere. The executable TRS-encoded software will be bonded to that particular platform. Similarly, the play back parameters of the player could also be fixed and TRS-encoded, further limiting the portability of the code; and 4. for use in connection with computing environments having very limited hardware resources (such as PDAs), this approach requires cross-generation of the TRS. That is, the TRS encoding must be performed on a platform with significant hardware resources, after which it can be downloaded to a resource weak platform such as a PDA.

While particular embodiments of the present invention have been shown and described, it is clear that changes and modifications may be made to such embodiments without departing from the true scope and spirit of the invention.

It is understood that as de-compiling and debugging tools become more and more powerful, the degree to which the techniques of the invention must be applied to ensure effective tamper protection, will also rise. As well, the concern for system resources may also be reduced over time as the cost and speed of computer execution and memory storage capacity continue to improve.

These improvements in system resources will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps.

Similarly, an electronic memory means such computer diskettes, CD-Roms, Random Access Memory (RAM), Read Only Memory (ROM) or similar computer software storage media known in the art, may store code to execute such method steps. As well, electronic signals representing these method steps may also be transmitted via a communication network.

What is claimed is:

1. A method of protecting digital audio and/or visual and/or information content in integral combination with means for playing the content, for secure handling and distribution of the content, the method comprising the steps of:

(a) providing an executable program configured for playing the digital content to one or more media output devices and including usage controls for providing protection to the digital content by controlling usage of the digital content;

(b) embodying the digital content within the provided executable program by forming a content-distributing program, with embodied digital content, and with the provided executable program; and encoding the content-distributing program into a tamper-resistant content-distributing program, said encoding including generating software which obscures the content-distributing program and generating software which is chaotic upon modification to prevent direct theft of the content from the tamper-resistant content-distributing program and render the tamper resistant content-distributing program resistant to removal of the usage controls, such that the tamper-resistant content-distributing program is in form for distribution and execution by computer processing means for playing the digital content to one or more media output devices.

2. The method of claim 1, wherein the step of embodying comprises embodying the digital content within
the executable program's data.

3. The method of claim 1, wherein said step of encoding the content-distributing program into a tamper-resistant content-distributing program comprises data-flow encoding.

4. The method of claim 1, wherein said step of encoding includes generating the tamper-resistant content-distributing program for distribution as a media batch file suitable for transport on a commodity high-volume, highly portable media format, the media batch file being executable for playing the digital content to one or more media output devices and thereby restricting resource-intensive signal-processing required for the playing of the digital content until the content is played for consumption by one or more consumers of the content.

5. The method of claim 1 further comprising:
generating a plurality of disparate instances of said digital audio and/or visual and/or information content;
successively protecting each of the plurality of instances of content in integral combination with a randomly selected part of the means for playing, with different parts of the means for playing being combined with disparate content instances of the plurality of disparate content instances and all parts of the means for playing being combined with the plurality of disparate content instances, such that an attacker is presented with randomly differently constructed content-distributed programs for successive content instances.

6. The method of claim 5 performed at least in part by a compiler for automated production of the content-distributing programs.

7. An electronic device executing a compiler configured to perform the method of claim 5.

8. A computer-readable memory medium storing a compiler configured to perform the method of claim 5.

9. The method of claim 1 performed at least in part by a compiler for automated production of the content-distributing program.

10. An electronic device executing a compiler configured to perform the method of claim 1.

11. A computer-readable memory medium storing a compiler configured to perform the method of claim 1.

12. The method of claim 1, wherein the step of embodying comprises embodying the digital content within an input stream to the executable program concealed by a form of encoding.

13. The method of claim 1, wherein said step of encoding the content-distributing program into a tamper-resistant content-distributing program comprises mass-data encoding.

14. The method of claim 1, wherein said step of encoding the content-distributing program into a tamper-resistant content-distributing program comprises encryption with a corresponding white-box decryption performed at a latest possible step.

15. The method of claim 1, wherein said step of encoding the content-distributing program into a tamper-resistant content-distributing program comprises creating a watermark image and applying the watermark image to the executable program of the content-distributing program.

* * * * *